United States Patent

[11] 3,607,331

| [72] | Inventors | Greene W. Strother;<br>William P. Coker, both of Lake Jackson, Tex. |
|---|---|---|
| [21] | Appl. No. | 733,809 |
| [22] | Filed | June 3, 1968 |
| [45] | Patented | Sept. 21, 1971 |
| [73] | Assignee | The Dow Chemical Company<br>Midland, Mich. |

[54] CLAY-STARCH PAPER COATING COMPOSITIONS
9 Claims, No Drawings

| [52] | U.S. Cl. | 106/214, 106/213, 117/156, 117/165 |
|---|---|---|
| [51] | Int. Cl. | C08b 25/02 |
| [50] | Field of Search | 162/164; 106/214, 213; 260/2 EN; 117/156, 165 |

[56] References Cited
UNITED STATES PATENTS

| 2,595,935 | 5/1952 | Daniel | 162/164 |
|---|---|---|---|
| 2,698,793 | 1/1955 | Landes | 260/2 |
| 3,245,816 | 4/1966 | Settwalbe | 106/214 X |

Primary Examiner—Lorenzo B. Hayes
Attorneys—Griswold & Burdick and C. E. Rehberg ABSTRACT: Clay-starch coating compositions have increased adhesion to paper when mixed with a small amount of a copolymer of a polyalkylenimine and an epihalohydrin. The copolymer insolubilizes the starch binder and thus increases its effectiveness in water resistant applications.

CLAY-STARCH PAPER COATING COMPOSITIONS

BACKGROUND OF THE INVENTION

It is known that a polyalkylenimine-epihalohydrin copolymer increases the wet strength of paper when added to an aqueous pulp during manufacture (British Pat. No. 1,008,464). Polyethylenimine-epihalohydrins are taught to be pigment binders to improve the tear resistance of paper when wet (U.S Pat. No. 1,849,411). Starch is known to be an effective pigment binder for dry uses, but its effectiveness is poor when water resistance is a necessary property of a coating composition.

SUMMARY OF THE INVENTION

It has now been found that the addition of a small amount of a polyalkylenimine-epihalohydrin copolymer to a clay-starch coating composition increases the adhesion of the coating composition to the paper. The copolymer insolubilizes the starch binder and thus increases its effectiveness in water resistant applications. The paper coating compositions of this invention have improved wet rub resistance and paper adhesion ability when compared to clay-starch compositions not containing a polyalkylenimine-epihalohydrin copolymer.

The clay-starch compositions to which the polyalkylenimine-epihalohydrin copolymer are added are well known in the art. In general, prior to curing, they contain, by weight, 30 to 50 percent clay, 5 to 7 percent starch and 35 to 55 percent water, and can be modified with various additives that impart some special property to the coating. In addition to clay, other pigments can be added to the clay-starch mixture without affecting the improved properties of the coating composition; e.g., $Mg(OH)_2$, $CaCO_3$, talc or $TiO_2$ can be present in the coating composition.

In order to impart the desirable properties disclosed herein to the coating composition, a polyalkylenimine-epihalohydrin copolymer is simply mixed, in any convenient manner, with the clay-starch composition at any time prior to coating the paper. The composition containing the copolymer is then applied to the paper in any normal manner (e.g., with rollers) and the resulting coated paper is then cured in a usual way, e.g. by a forced draft oven.

The polyalkylenimine-epihalohydrin copolymer used in this invention is preferably a polyethylenimine-epichlorohydrin copolymer, but any polyalkylenimine, e.g. polyethylenimine containing lower alkyl groups, such as polyl 1,2-propylenimine and poly-2,3-butylenimine, can be used. Similarly, epibromohydrin can be employed in producing the copolymer. In general, it is preferred to produce the copolymer by reacting one mole of epihalohydrin per equivalent of amino hydrogen in the polyalkylenimine at low temperatures, e.g. 30°–60° C., for a few hours. The molecular weight of the polyalkylenimine is preferably between 200 and 100,000.

The amount of copolymer added to the clay-starch mixture varies, depending upon the degree of wet rub resistance and adhesion desired. Suitably, however, any starch-insolubilizing amount of copolymer may be used. In general, any amount of copolymer in excess of 2 percent of the coating composition, by weight, is desirable. It is preferred to use a clay-starch coating composition containing between 2 and 5 percent copolymer.

The cure time and temperature vary depending upon the thickness of coating desired, the temperature used and the clay-starch formulation, but, in general, for a thin coating (e.g., 3 mils) a temperature between 100° and 120° C. and a time around 3 minutes will suffice.

DESCRIPTION OF SPECIFIC EMBODIMENT

A clay-starch mixture was prepared as follows: 500 g. of clay was slowly added to 170 g. of distilled water containing 7.5 g. of a 20 percent aqueous solution of sodium hexametaphosphate. In a separate procedure, 75 g. of ozidized starch was cooked for 30 minutes with 390 g. of distilled water in a steam cone. Upon cooling, the starch mixture and the clay mixture were blended. 50 g. of this blended mixture were placed in a wide-mouth bottle and a specific amount of copolymer was mixed therewith. A bead of this coating composition was poured onto paper that was taped on a glass plate and the composition was spread over the paper with a draw bar to a thickness of 3 mils. After coating and air drying, the coated paper was cured in a forced draft oven for 3 minutes at a temperature between 100° and 120° C.

Immediately after curing, the paper was tested for wet rub resistance by wetting the test paper in five spots with five drops of water. After wetting, a piece of black paper was placed under the test sheet and the wetted spots were rubbed across the black paper with a finger. The first drop was wiped three times on the black paper, the second was wiped six times, 12 for the third, 18 for the fourth and 24 for the fifth. The amount of pigment removed from the test sheet is a measure of the wet rub resistance.

The paper adhesion of the coating composition was tested by pressing 1 inch of adhesive tape to the coating and then ripping it off. 90–100 percent of paper fiber tearing was considered evidence of good adhesion.

The following amounts of a copolymer of polyethylenimine and epichlorohydrin (formed by the reaction of equivalent amounts of epichlorohydrin and polyethylenimine having a molecular weight of 600 for 3 hours at 35–50° C.) were added to 50 g. of the clay-starch composition: 2 percent, 3 percent, 4 percent and 5 percent, based on total weight of final coating composition.

These four coating compositions were applied to paper, by the above procedure, and tested for wet rub resistance and adhesion. In each of the four tests, the increased wet rub resistance of the copolymer-containing coating composition was demonstrated by a finding that after 24 rubs, a composition containing the copolymer left an equivalent amount of coating on the black paper as did the blank (i.e. the same composition without copolymer) after only three rubs. After 60 rubs the composition containing 5 percent copolymer left an equivalent amount of coating as did the blank after only three rubs. Adhesion was demonstrated by the finding that, in each case, 90–100 percent of the tear was paper fiber tear in the adhesion test using the composition containing the copolymer while only 70–80 percent of the tear was fiber tear using the untreated composition.

We Claim:

1. In a paper coating composition comprising, by weight:
   1. 30–50 percent of clay;
   2. 5–7 percent of water-soluble starch;
   3. 35–55 percent of water; and
   4. a starch-insolubilizing agent, the improvement comprising including in said composition, as said insolubilizing agent, copolymer of (a) a polyalkylenimine having a molecular weight between 200 and 100,000 and selected from the group consisting of polyethylenimine, poly-1,2-propylenimine and poly-2,3-butylenimine and (b) an epihalohydrin selected from the group consisting of epichlorohydrin and epibromohydrin in an amount sufficient to insolubilize said starch.

2. A composition as defined in claim 1 wherein the copolymer is made by reacting 1 mole per epihalohydrin equivalent of amino hydrogen in the polyalkylenimine.

3. A composition as defined in claim 1 containing $Mg(OH)_2$, $CaCO_3$, talc, or $TiO_2$.

4. A composition as defined in claim 1 wherein the polyalkylenimine is polyethylenimine.

5. A composition as defined in claim 1 wherein the epihalohydrin is epichlorohydrin.

6. A composition as defined in claim 4 wherein the epihalohydrin is epichlorohydrin and the amount of copolymer is between 2 and 5 percent of the weight of the total coating composition.

7. Paper coated with the composition of Claim 1.

8. Paper as defined in claim 7 on which the coating has been cured.

9. A composition as defined in claim 1 wherein the amount of copolymer is at least 2 percent by weight of the total composition.

PO-1050
(5/69)

UNITED STATES PATENT OFFICE
CERTIFICATE OF CORRECTION

Patent No. 3,607,331      Dated 21 Sept. 1971

Inventor(s) Greene W. Strother and William P. Coker

It is certified that error appears in the above-identified patent and that said Letters Patent are hereby corrected as shown below:

In Column 1, line 9, change "1,849,411" to read -- 2,849,411 --.

Column 2, Claim 2, line 59, delete "per" and insert -- of --' in line 60, delete "of" and insert -- per --.

Signed and sealed this 21st day of March 1972.

(SEAL)
Attest:

EDWARD M. FLETCHER, JR.
Attesting Officer

ROBERT GOTTSCHALK
Commissioner of Patents